United States Patent
Griffith et al.

(10) Patent No.: US 7,264,363 B2
(45) Date of Patent: Sep. 4, 2007

(54) DEFORMABLE-MIRROR COOLING

(75) Inventors: Michael S Griffith, Chelmsford (GB);
Nicholas J Archer, Chelmsford (GB);
Leslie C Laycock, Chelmsford (GB)

(73) Assignee: BAE Systems PLC, London (GB)

( * ) Notice: Subject to any disclaimer, the term of this patent is extended or adjusted under 35 U.S.C. 154(b) by 22 days.

(21) Appl. No.: 10/537,894

(22) PCT Filed: Dec. 18, 2003

(86) PCT No.: PCT/GB03/05507

§ 371 (c)(1),
(2), (4) Date: Jun. 7, 2005

(87) PCT Pub. No.: WO2004/057406

PCT Pub. Date: Jul. 8, 2004

(65) Prior Publication Data

US 2006/0103955 A1    May 18, 2006

(30) Foreign Application Priority Data

Dec. 23, 2002   (GB)   ................. 0230038.2
Dec. 23, 2002   (GB)   ................. 0230040.8
Apr. 30, 2003   (GB)   ................. 0310423.9

(51) Int. Cl.
*G02B 7/195*   (2006.01)
*G02B 7/188*   (2006.01)

(52) U.S. Cl. ...................... 359/845; 359/847
(58) Field of Classification Search ............. 359/849, 359/845, 846, 847
See application file for complete search history.

(56) References Cited

U.S. PATENT DOCUMENTS 3,644,020 A    2/1972   Shannon
3,731,992 A    5/1973   Mansell
3,923,383 A *  12/1975  Engel et al. ................. 359/845

(Continued)

FOREIGN PATENT DOCUMENTS

DE    100 52 249 A1    4/2002

(Continued)

OTHER PUBLICATIONS

Ikramov A.V. et al.: "Bimorph adaptive mirror", Soviet Journal of Quantum Electronics, American Institute of Physics, Woodbury, NY, US, vol. 22, No. 2, Feb. 1, 1992, pp. 163-168.*

(Continued)

*Primary Examiner*—Jordan Schwartz
*Assistant Examiner*—James C Jones
(74) *Attorney, Agent, or Firm*—Nixon & Vanderhye P.C.

(57) ABSTRACT

This invention relates to a cooled deformable-mirror and its mount. A deformable mirror is provided comprising a reflective element provided on a substrate that is secured to a deformable element, wherein the substrate comprises at least one channel having a pair of ports both located around the peripheral edge of the substrate. In addition, a deformable-mirror mount and the deformable mirror described above are provided, wherein the mount has a body with a central aperture defined by a supporting surface sized and shaped to support the mirror when installed, and wherein the mount is provided with at least a pair of channels that terminate to face the ports in the mirror when the mirror is installed, the channels of the mirror and the mount being connected via flexible seals.

17 Claims, 5 Drawing Sheets

U.S. PATENT DOCUMENTS

| | | | |
|---|---|---|---|
| 3,972,600 A | 8/1976 | Cobarg | |
| 3,986,768 A * | 10/1976 | Peters et al. | 359/845 |
| 4,143,946 A | 3/1979 | Leo et al. | |
| 4,239,343 A | 12/1980 | Wrench | |
| 4,674,848 A * | 6/1987 | Aldrich et al. | 359/845 |
| 4,733,945 A * | 3/1988 | Bacich | 359/820 |
| 5,094,519 A * | 3/1992 | Ealey et al. | 359/845 |
| 5,172,277 A | 12/1992 | Wahl et al. | |
| 5,209,291 A * | 5/1993 | Taylor | 165/168 |
| 5,801,891 A | 9/1998 | Lloyd | |
| 6,048,070 A * | 4/2000 | LaFiandra | 359/846 |
| 6,307,688 B1 * | 10/2001 | Merz et al. | 359/819 |
| 6,388,823 B1 | 5/2002 | Gaber et al. | |
| 6,425,671 B1 | 7/2002 | Adler et al. | |
| 7,069,975 B1 * | 7/2006 | Haws et al. | 165/10 |

FOREIGN PATENT DOCUMENTS

| | | |
|---|---|---|
| EP | 0 743 541 A1 | 11/1996 |
| GB | 2 249 641 A | 5/1992 |
| JP | 61-285424 | 12/1986 |
| JP | 7-261100 | 10/1995 |
| WO | 95/21394 | 8/1995 |
| WO | 02/12948 A2 | 2/2002 |
| WO | 03/016976 A2 | 2/2003 |

OTHER PUBLICATIONS

International Search Report of PCT/GB03/05507 mailed Nov. 22, 2004.

EP Search Report of EP 02 25 8826 dated May 22, 2003.

GB Search Report of GB 0230040.8 dated Oct. 9, 2003.

GB Search Report of GB 0230038.2 dated Mar. 4, 2003.

A.V. Ikramov et al., "Bimorph Adaptive Mirror", Soviet Journal of Quantum Electronics, American Institute of Physics, vol. 22, No. 2, Feb. 1, 1992, pp. 163-166, XP000273608.

* cited by examiner

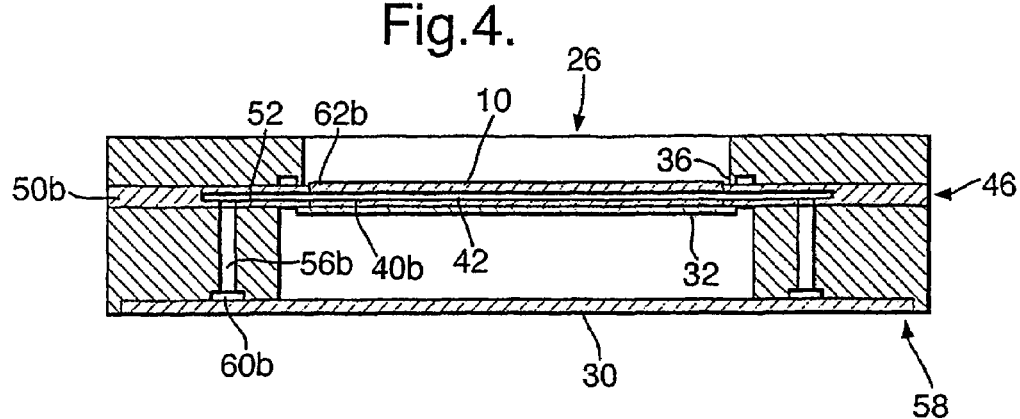
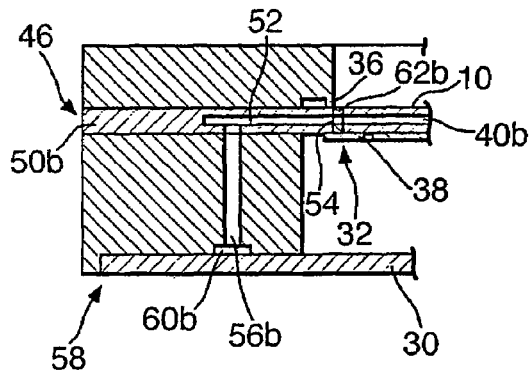
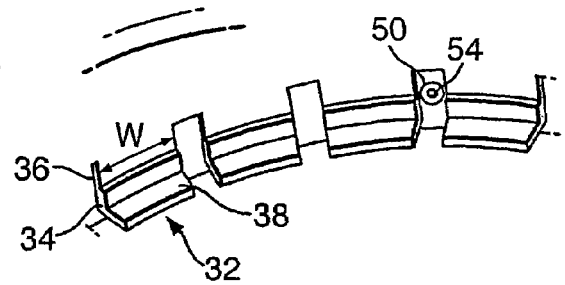
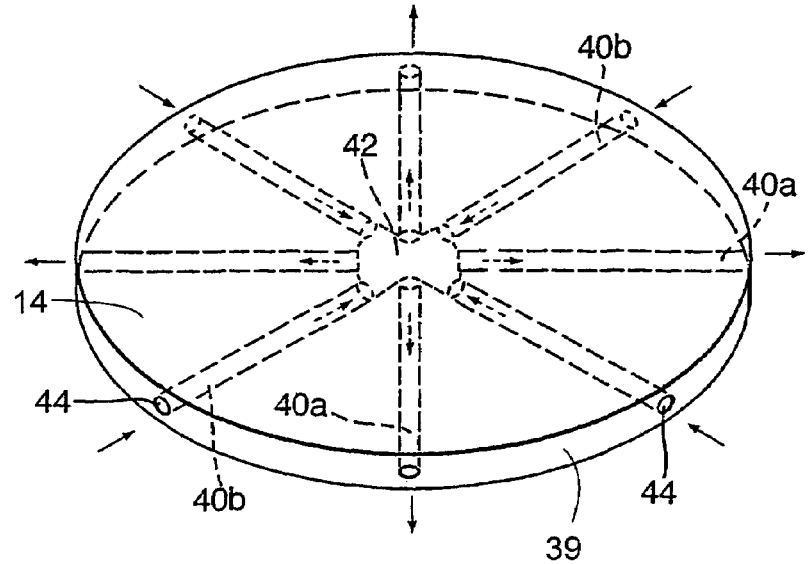

DEFORMABLE-MIRROR COOLING

This application is the US national phase of international application PCT/GB2003/005507 filed 18 Dec. 2003, which designated the U.S. and claims priority of GB 0230038.2, filed 23 Dec. 2002; GB 0230040.8, filed 23 Dec. 2002; and GB 0310423.9, filed 30 Apr. 2003, the entire contents of each of which are hereby incorporated by reference.

This invention relates to a cooled deformable-mirror and its holder. In particular, this invention relates to a cooled high-power deformable mirror and is particularly well-suited to bimorph mirrors.

Deformable mirrors are often used in the field of adaptive optics. For example, phase distortions in a signal may be sensed by a wavefront sensor and these distortions may be corrected for by an adaptive mirror. Such adaptive mirrors may be employed in numerous fields, including:

imaging, for example adaptive mirrors are used in astronomy to improve the resolution of earth-based telescopes that are otherwise affected by atmospheric distortions;

laser sensing, where the amount of laser light that can be delivered onto a target is significantly increased by using an adaptive mirror to correct for atmospheric distortions—this enables either better information to be obtained or objects to be identified at a greater range; and laser generation, where an adaptive mirror can be used intracavity within a high power laser to counter the thermal blooming that can be otherwise induced by the high concentration of laser light inside the cavity.

Deformable mirrors generally comprise a substrate bonded to an active element. The active element is made to deform to adopt a desired shape, for example a convex shape, and this in turn causes the substrate to bend to the same shape. The active element is usually a piezoelectric material bonded to a substrate using an epoxy resin. Bimorph mirrors conform to this general arrangement.

Bimorph deformable mirrors have been proposed as low cost adaptive mirrors. The two main operational parameters of a bimorph mirror are its bandwidth and its stroke. Bandwidth determines how quickly the mirror can be deformed and hence, for example, how quickly the mirror can respond to the variations in atmospheric turbulence. Stroke corresponds to the maximum displacement of the mirror when deformed and this determines, for example, the level of turbulence that can be corrected. Ideally, both bandwidth and stroke would be maximised. However, conventional designs mean that there is a reciprocal relationship between these two parameters, and one parameter can only be improved at the expense of the other. Therefore, to date, designers have always looked for ways to improve either the resonant frequency or the stroke independently from each other.

Another issue that needs addressing is thermal management. The two main aspects of this are heat absorbed from any incident radiation must be dissipated and the effect of temperature fluctuations on the mirror. If the mirror is excessively heated, the active element will de-pole or lose efficiency. If the glass substrate and the active element have linear thermal expansion coefficients that are very different, the pair of materials will act as a bimetallic strip and distortions will be introduced into the mirror as the temperature of the mirror changes. This can be corrected for by applying a bias to the active element, but this will reduce the available stroke of the mirror.

In lower-power mirrors, thermal management may be achieved by using a very high-reflectivity surface, so that very little of the incident radiation is absorbed.

In higher-power mirrors, the very large intensity of incident radiation means that some form of active cooling of the mirror is required. Most commonly, this is water cooling due to its efficiency. In these arrangements, water is allowed to flow across the mirror in linear fashion. However, temperature gradients frequently develop across the mirror, even when large flows of water are used.

From a first aspect, the present invention resides in a deformable mirror comprising a reflective element provided on a substrate that is secured to a deformable element, wherein the substrate comprises at least one channel having a pair of ports both located around the peripheral edge of the substrate. This allows cooling water or any other coolant to be circulated directly within the substrate.

Preferably, the substrate comprises a plurality of channels, each having ports located around the peripheral edge of the substrate and wherein the channels are interconnected by a chamber. The plurality of channels may be distributed evenly around the substrate to ensure even cooling around the mirror.

Optionally, the plurality of channels intersect to form the chamber. This allows water passing down the channels to mix and to be forced through different channels, e.g. if water is passed down two opposing arms of a channel, it would then mix before flowing down alternative arms of channels and exiting the mirror. Optionally, the channels extend radially to intersect at the centre of the substrate, i.e. in a hub and spoke arrangement. In an alternative embodiment, the channels extend from a central portion of the substrate to the edge of the mirror in an offset arrangement, thereby intersecting to form a substantially ring-shaped chamber.

From a second aspect, the present invention resides in a deformable-mirror mount and a deformable mirror as described above, wherein the mount has a body with a central aperture defined by a supporting surface sized and shaped to support the mirror, and wherein the mount is provided with at least a pair of channels that terminate to face the ports in the mirror, the channels of the mirror and the mount being connected via flexible seals. By clever use of seals at the edge of the mirror substrate, we have been able to pump water in and out of a simply-supported mirror with minimal load applied to the mirror. If a conventional connector and hose were used directly on the mirror, it would decrease the effective active area of the mirror (i.e. the part of the mirror that can be deformed into a desired shape) and could result in non-uniform loading. This would reduce the mirror efficiency and could result in unwanted distortions. Optionally, the flexible seals are O-rings that are positioned to surround the channels in the mirror and the mount where they terminate to face each other.

Preferably, the mirror comprises a plurality of channels that terminate to form a plurality of ports in the peripheral edge of the substrate and wherein a channel is provided in the mount for each port, the channel terminating to face its associated port and wherein alternate channels communicate to an inlet and an outlet.

Optionally, the aperture of the mount is defined by a plurality of flexible beams, each flexible beam having an end shaped to provide the supporting surface and a flexible portion that connects the beam's end to the mount's body. This is a convenient way of allowing the mirror to deform because the beams may flex without offering any significant resistance to deformation of the mirror. Preferably, at least one of the flexible beams is generally L-shaped such that one leg of the L-shape provides the flexible portion and the other leg of the L-shape provides the support surface of the beam's end. In a currently preferred embodiment, the internal corner of the L-shaped beam has a shoulder that extends part of the way along both legs such that the mirror when installed is supported from below by the supporting surface of the flexible beam and from the side by the shoulder of the flexible beam. Where flexible beams are employed, the channels may terminate at a gap between pairs of flexible beams. This means that the beams may flex without impediment for the part of the mount's body that defines the channels.

Optionally, the channels are provided by plugs inserted into passages provided in the mount's body. These plugs may extend beyond the mount's body to terminate between the flexible beams. The flexible beams may optionally be shaped to accommodate the plugs and the O-rings that connect the plugs to the mirror's peripheral edge. This is particularly beneficial where only a small gap is left between adjacent beams. Preferably, the channels in the plugs communicate with a pair of channels provided in an outer surface of the mount's body that extend around the aperture and, optionally, the channels in alternate plugs may communicate with one or the other of the channels in the mount's body in turn.

Optionally, in accordance with an embodiment of the invention which will be described hereafter in detail a bar-shaped flexure mount design is provided with a coolant being fed into and out of various radially extending conduits through the flexures. The advantage of the arrangement in this embodiment is that it removes the need for O-ring seals.

In order that the invention can be more readily understood, reference will now be made, by way of example only, to the accompanying drawings in which:

FIG. 4 is a section along line IV-IV of FIG. 2;

FIG. 5 is a detail from FIG. 4;

FIG. 6 is a perspective view of some of the beams and a conduit of the holder;

FIG. 7 is a perspective view of the substrate of the deformable mirror of FIG. 1 showing some of the internal detail with dotted lines;

A deformable mirror 10 and its holder 12 are shown in FIGS. 1 to 11, including parts of its cooling system. Before describing the cooling system, the mirror 10 and its mount 12 will be described such that the method of supporting the mirror 10 is demonstrated thus allowing an appreciation that the cooling system has little impact on this method of support in due course.

Figure 1:
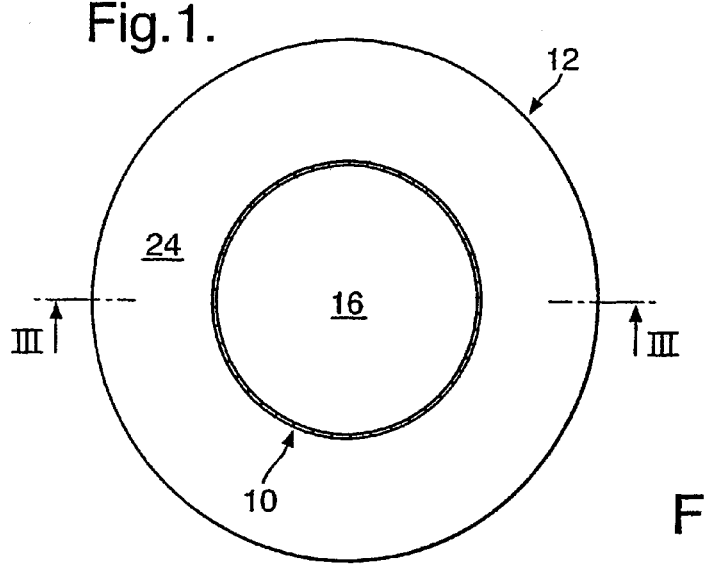
FIG. 1 is a plan view from above of a deformable mirror and a mount according to the present invention.
Figure 2:
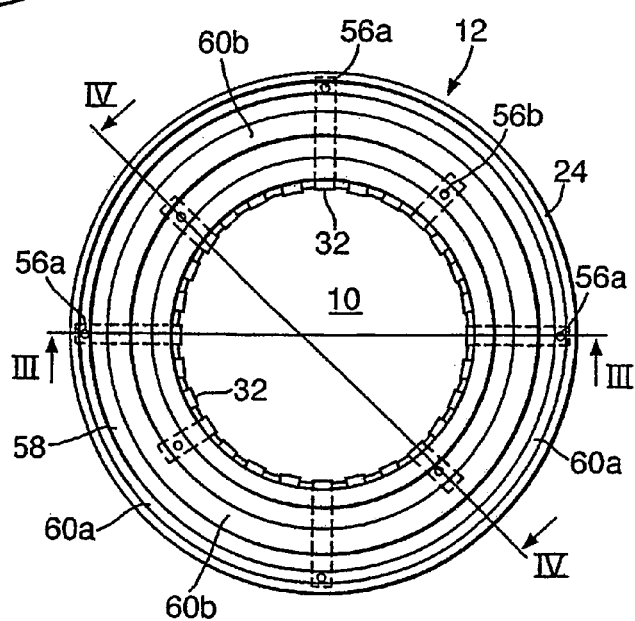
FIG. 2 is a plan view from below of the deformable mirror and mount of FIG. 1, with the base cap removed and showing some of the internal detail with dotted lines.
Figure 3:
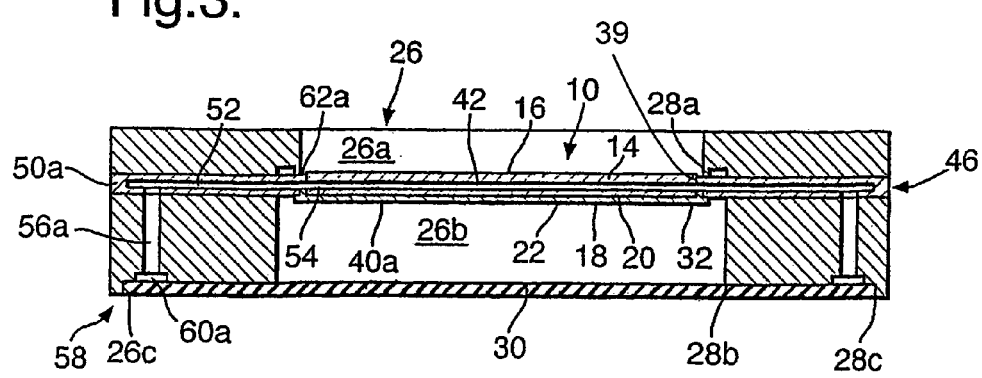
FIG. 3 is a section along line III-III of FIGS. 1 and 2.

The mirror 10 is best seen in FIGS. 3 to 5. The mirror 10 comprises a copper substrate 14 whose outer face 16 provides a reflecting surface by virtue of a series of thin dielectric coatings provided on the outer surface 16 (not shown). An active piezoelectric element 18 is bonded to the substrate 14 using epoxy resin 20. An array of forty-five electrodes 22 are used to activate the piezoelectric element 18. Applying a potential to the electrodes 22 causes the piezoelectric element 18 to deform so that, in turn, the substrate 14 deforms to create a mirror 10 with a desired shape, convex for example.

The mount 12 is a unitary structure made from stainless steel and comprises a round body 24 that defines a central circular aperture 26. The aperture 26 is shaped and sized to receive the mirror 10 therein. Hence, the mirror 10 is held in a protected position within the mount 12. Whilst the outer edge of the mount's body 24 are regular, the internal edges are stepped to form a series of three interconnected and concentric circular apertures 26a-c that increase in size from top to bottom. The stepped inner profile of the mount 12 produces a series of three shoulders 28a-c. The lowermost aperture 26c receives a correspondingly-shaped and sized base cap 30, as shown in FIGS. 3 and 4.

Twenty-eight generally L-shaped flexible beams 32 extend downwardly in cantilever fashion from the topmost of the shoulders 28a. The beams 32 are of identical size and shape and are equispaced around the circular topmost shoulder 28a. The beams 32 are L-shaped such that they extend downwardly from the topmost shoulder 28a before turning through 90° to extend inwardly towards the centre of the middle aperture 26b, as best seen in FIG. 6. Rather than having a pure L-shape, a square-shaped support shoulder 34 extends from the internal corner of each beam 32. The support shoulder 34 only extends partially up the height of the upright portion of the beam 32, thereby leaving a narrow neck 36 in the portion of the beam 32 that bridges the topmost shoulder 28a of the mount body 24 and the support shoulder 34 of the beam 32. It is this neck 36 that gives the beam 32 its flexibility, i.e. this neck 36 can be deformed to allow the beam 32 to deflect and bend. The length and thickness of the necks 36 of the beams 32 are chosen to achieve the desired flexing properties. FIG. 6 shows four of the beams 32 in perspective and indicates the width W of the beams 32 relative to their separation. It is the relative width of the beams 32 that gives the required degree of stiffness in the plane of the mirror 10.

The inwardly-extending portion of the beam 32 extends beyond the support shoulder 34 to provide an upwardly-facing support surface 38 for receiving the mirror 10. The mount 12 and the beams 32 are sized such that the mirror 10 may be received within the beams 32 to be supported from below by the support surfaces 38 and so that the mirror's peripheral edge 39 fits snugly against the upright face of the support shoulders 34. Hence, the mirror 10 is held firmly in place. As the mirror 10 deforms, it remains firmly held in place against the support surface 38 and support shoulder 34 because the beams 32 deflect with the mirror 10 by flexing about their necks 36.

The cooling system will now be described, starting with the features provided in the mirror 10 itself. As can be seen best from FIG. 7, eight radially extending conduits 40 are provided in the substrate 14 (the epoxy resin 20, piezoelectric element 18 and electrodes 22 have been omitted from FIG. 7 for the sake of clarity). The eight conduits 40 are arranged in equispaced fashion such that they pair to form through-passages and are arranged at the same level within the substrate 14 thereby intersecting to form a central chamber 42. The conduits 40 are circular in cross-section, as can be seen from the circular ports 44 that are made where the conduits 40 meet the peripheral edge 39 of the substrate 14.

Turning now to the mount 12, eight radially extending through-passages 46 are provided in the mount 12. The through-passages 46 are equispaced such that they will align with the conduits 40 in the mirror 10 when the mirror 10 is correctly installed in the mount 12. The through-passages 46 are identical and are formed by drilling into the mount 12 towards the centre. For each through-passage 46, the drill breaks through the internal edge of the mount 12 aligned with a gap between beams 32. The drill is allowed to continue towards the centre of the mount 12 such that it removes material from the edges of the beams 32 adjacent the port 44 of the mirror 10: this can be seen from FIG. 6.

The through-passages 46 are filled with a hollow plug 50 that is of a length such that it terminates at one end to be flush with the outer edge of the mount 12 and such that it terminates at the other end just short of a position that is flush with the support shoulders 34 of the beams 32. The internal cavity 52 of each plug 50 extends to present a port 54 between the beams 32. However, it does not break the other end of the plug 50, but instead turns through 90° such that it faces a vertically extending passage 56 in the mount 12. The 90° turn is at the end nearest the outer edge of the mount 12. Two types of plug 50a,b are used for alternate through-passages 46: the 90° turn is nearer the outer edge in one type of plug 50a than in the other type 50b, as best seen from FIGS. 3 and 4. The internal cavity 52 of the plugs 50 meet vertical passages 56 provided in the mount 12. The vertical passages 56 extend to the base 58 of the mount 12 to meet one of two circular troughs 60a,b provided in the base 58 of the mount 12, depending upon where the 90° turn is positioned. The base cap 30 provides a surface that closes each trough 60a,b thereby forming two enclosed channels: two holes (not shown) are provided in the base cap 30 to allow access to the troughs 60a,b, and the holes are not aligned with the vertical passages 56 provided in the mount 12 such that water circulates around the troughs 60a,b before entering or after exiting the vertical passages 56, as will be described below.

Water is circulated through the cooling system as follows. A hose is connected to the hole in the base cap 30 that communicates with the inner trough 60b of the base 28 of the mount 12. Water circulates under pressure around the trough 60b before passing up one of the vertical passages 56b and into the internal cavity 52 provided in four of the plugs 50b, whereby it flows to the port 54 that faces the mirror 10. A water-tight channel is maintained to the mirror 10 by placing O-ring seals 62b between the end of the plugs 50b and the mirror's peripheral edge 39. The O-rings 62b are placed to surround both the conduits' and the plugs' ports 44,54 thereby forming a water-tight seal. The flexible nature of the O-ring 62b ensures that the water-tight channel is not compromised by deformation of the mirror 10, nor does it present an appreciable resistance to deformation of the beams 32. Hence, water flows from the plugs 50b into four of the conduits 40b provided in the mirror 10 and subsequently mixes in the central chamber 42. Water can then exit via the remaining four conduits 40a, back out of the mirror 10 through four further O-ring seals 62a and into the four other plugs 50a. From here the water exits down the four remaining vertical passages 56a to mix once more in the outer trough 60a provided in the base 58 of the mount 12. From here, the water exits through the second of the holes in the base cap 30, to which a hose is attached.

In this way, water is directed towards the centre of the mirror 10 where the maximum heating occurs from incident radiation. By providing entry and exit ports 44 for the coolant around the peripheral edge 39 of the mirror 10, we have eliminated the need for additional space for coolant seals on the mirror face. This enables a minimal size mirror 10 to be used. Furthermore, we have also located the O-rings 62 at the point of minimum movement of the substrate 14 during mirror deformation.

This mirror design results in a plain, parallel-sided disc that aids any subsequent polishing processes.

Figure 8A:
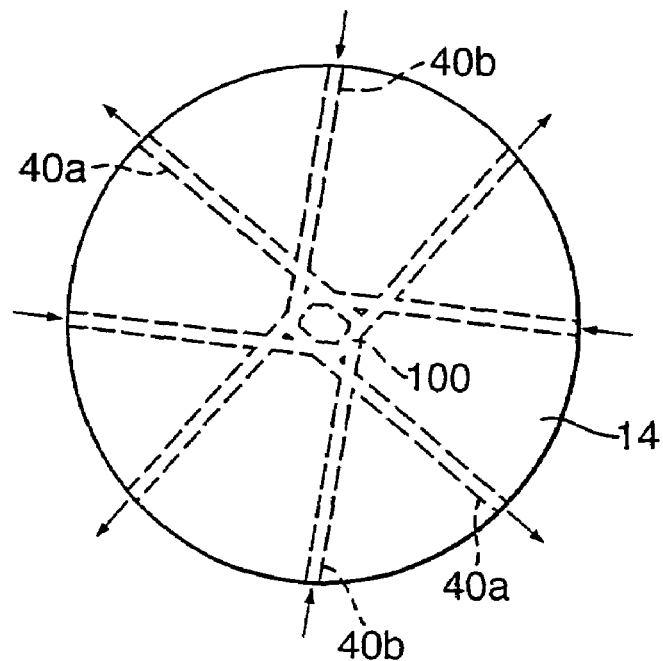
FIGS. 8a and 8b are plan and perspective views respectively of an alternative embodiment of a substrate showing internal detail.
Figure 8B:
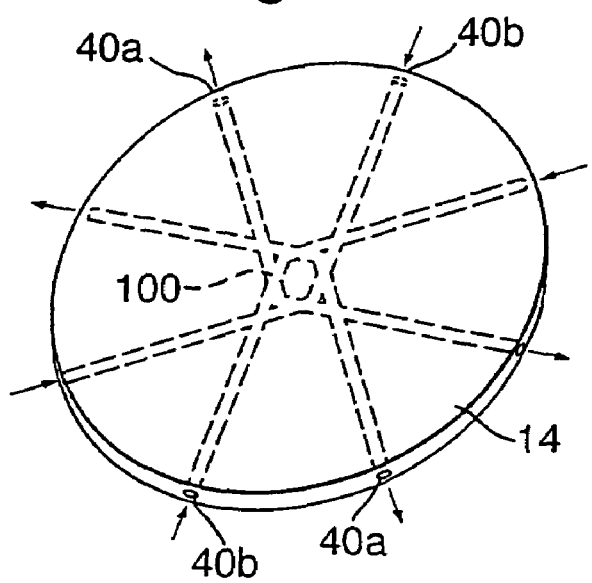

A second embodiment of the mirror substrate 14 is shown in FIG. 8. Many features of this substrate 14 are the same as for the substrate 14 shown in FIG. 7 and so have been assigned like reference numerals. In common with the substrate 14 of FIG. 7, the substrate 14 of FIG. 8 has eight conduits 40. However, the conduits 40 are no longer arranged radially to form a central mixing chamber 42. Instead, a mixing chamber 100 is created at the centre of the substrate 14 by offsetting the conduits 40. All the inlet conduits 40b are offset one way, while all the outlet conduits 40a are offset the other way. The result is a roughly toroidal mixing chamber 100 with turbulent circulatory flow. There will be relatively laminar flow in the inlet conduits 40a, but turbulent flow is induced in the mixing chamber 100, and the flow will remain turbulent in the outlet conduits 40b. The difference in types of flow will act to minimise any temperature gradient that might otherwise develop between the input and output conduits 40 because of differences in water temperature: although the temperature of the water in the outlet conduits 40a is likely to be higher, the heat exchange efficiency will also be higher because of the turbulent flow.

Figure 9:
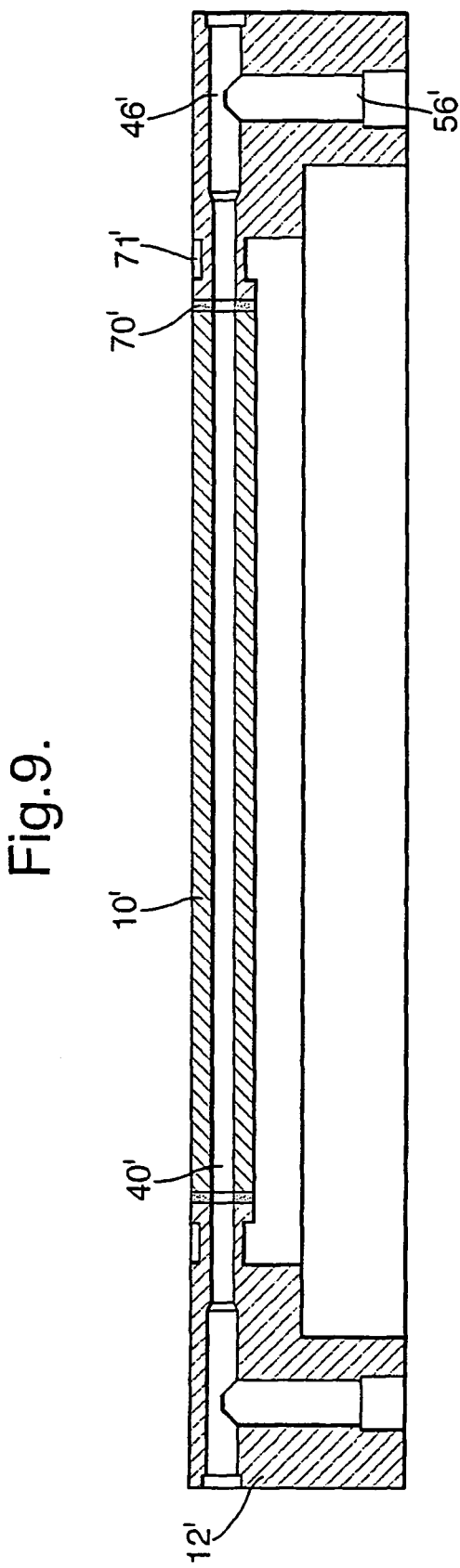
FIG. 9 is a view of a bar flexure mount design embodying the present invention.
Figure 10:
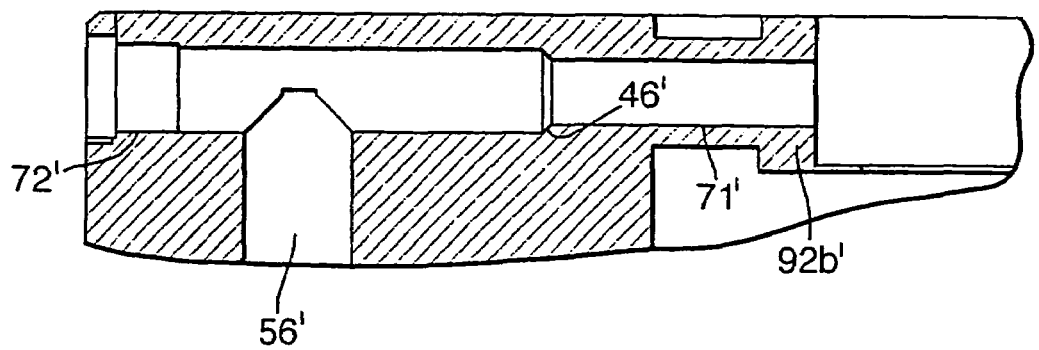
FIG. 10 is a cross-sectional view of the embodiment of FIG. 9.
Figure 11:
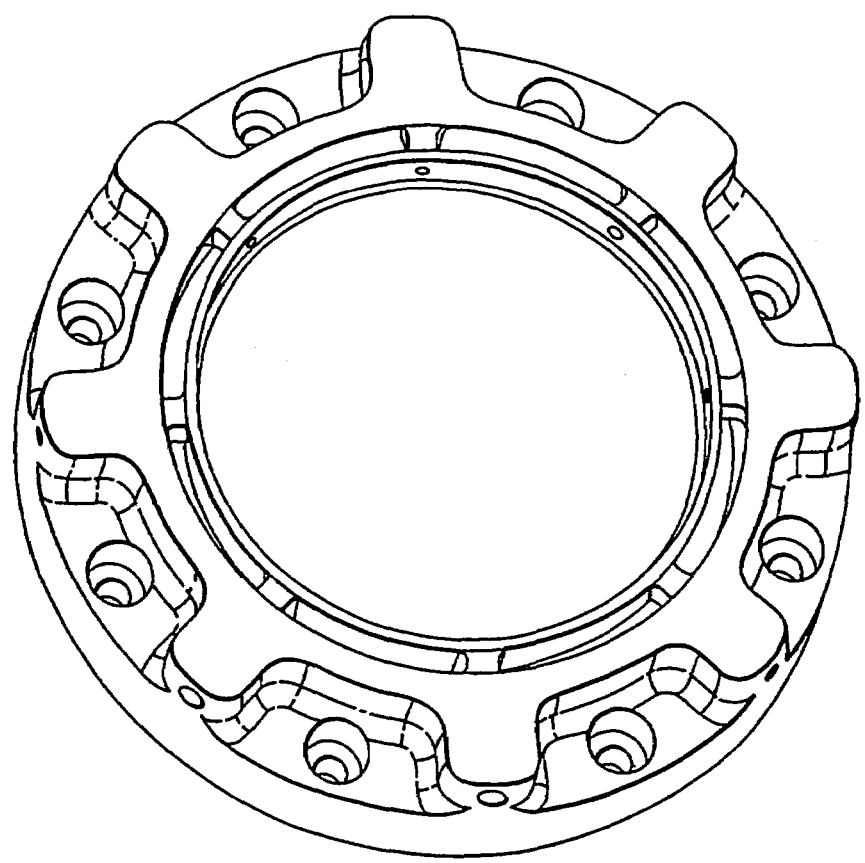
FIG. 11 is a view of the mirror mount using the bar flexure mount design of FIG. 9 (without the mirror in place).

A further embodiment of the invention is shown in FIGS. 9 to 11. Again, like reference numerals are used for like parts, the single primes denoting the parts that belong to the embodiment of FIGS. 9 to 11. FIG. 9 is a view of a bar flexure mount design embodying the present invention. FIG. 10 a cross-sectional view of FIG. 9 through one of the bar flexures 71'. FIG. 11 is a view of the whole mirror mount using the bar flexure mount design of FIG. 9. Note that FIG. 11 is a three-dimensional view of the mount without the mirror so that more detail can be seen. In this embodiment as shown, the flexure 71' is a short bar supporting a unitary L-shaped ring 92b' into which the mirror 12' is glued. Eight radially extending through-passages 46' are provided in the mount 12'. These go through the centre of the bar flexures 71' and line up with the radially extending conduits in the mirror. The outer end of the through passages are sealed with a plug once the mirror has been assembled. The glue layer 70' forms a seal between the mirror and the L-shape ring support, removing the need to use an O-ring. The route for the coolant is then, as shown, up through the vertical passages 56'. This meets the through passages in the mount and is diverted to the mirror conduits.

Thus in this way, as shown in the embodiment of FIGS. 9 to 11, coolant can be effectively fed into and out of the various radially extending conduits through the flexures. The advantage of such an arrangement is that it obviates the need for O-ring seals.

The person skilled in the art will appreciate that modifications can be made to the embodiments described hereinabove without departing from the scope of the invention.

Clearly, the shape of the mirror 10 and the corresponding aperture 26 in the mount body 24 are not fundamental and can be varied freely. The radial configuration of conduits 40 and passages 46 above can be varied. For example, more complex designs combining selectively cooled regions of the substrate 14, including mixing manifolds may also be devised. These may lead to an overall mass reduction. Moreover, the conduits 40 could simply extend from one point on the peripheral edge 39 of the substrate 14 to another point on the peripheral edge 39 of the substrate 14 and need not meet at a common chamber 42, such that water merely flows in one end of the conduit 40 and out the other 40.

Whilst flexible O-rings provide a convenient method of forming a water-tight channel between the mirror and the plugs in the mount, other seals are possible. Of course, it is highly beneficial if the seals are flexible such that they can accommodate deformation of the mirror without losing the integrity of the seal.

Whilst water has been described as the coolant above, other types of coolant can also be used, such as any gas, a liquefied gas such as liquid nitrogen, an anti-freeze solution or mercury. The mount 14 need not be made from stainless steel, but could also be made from other metals, plastics, glass or ceramic.

The invention claimed is:

1. A mirror structure comprising:
   a self-deforming mirror having a periphery, wherein said mirror comprises a substrate including at least one coolant channel having inlet and outlet ports located around the peripheral edge of the substrate, and
   a support structure for supporting said mirror around said periphery, said support structure having corresponding inlet and outlet ports fluidly connected to said substrate inlet and outlet ports.

2. A mirror structure as in claim 1, wherein the substrate includes a plurality of coolant channels interconnected by a chamber, each channel terminating in a port located around periphery of the substrate.

3. A mirror structure as in claim 2, wherein the plurality of channels intersect to form the chamber.

4. A mirror structure as in claim 3, wherein the chamber is located in a central portion of the substrate and the plurality of channels extend radially from the chamber to the periphery of the substrate.

5. A mirror structure as in claim 3, wherein the channels extend in an offset arrangement from a substantially ring-shaped chamber located in a central portion of the substrate to the peripheral edge of the substrate.

6. A mirror structure as in claim 1, wherein the support structure comprises a body with a central aperture defined by at least one supporting element sized and shaped to support the self-deforming mirror, and wherein the support structure corresponding inlet and outlet ports face the inlet and outlet ports in the substrate, further including flexible seals between the channels of the substrate and the support structure.

7. A mirror structure as in claim 6, wherein the flexible seals are O-rings.

8. A mirror structure as in claim 6, wherein the substrate includes a plurality of channels and the support structure includes a plurality of channels, wherein alternate channels around the periphery of the substrate comprise inlet and outlet ports.

9. A mirror structure as in claim 6, wherein the central aperture of the support structure is defined by a plurality of flexible beams, each flexible beam having an end shaped to provide a supporting surface for the self-deforming mirror and a flexible portion that connects an end of the beam to a body of the support structure.

10. A mirror structure as in claim 9, wherein at least one of the flexible beams is generally L-shaped such that one leg of the L-shape provides the flexible portion and the other leg of the L-shape provides the supporting surface.

11. A mirror structure as in claim 10, wherein each flexible beam further includes a shoulder portion for providing support to the periphery of said substrate.

12. A mirror structure as in claim 9, wherein each of the channels in the support structure terminate at a gap between an adjacent pairs of flexible beams.

13. A mirror structure as in claim 12, wherein the channels in the support structure are defined by plugs inserted into passages provided in the body of said support structure.

14. A mirror structure as in claim 13, wherein the flexible seals are O-rings and the flexible beams are shaped to accommodate the plugs and the O-rings provide an interface between the plugs to the periphery of the substrate.

15. A mirror structure as in claim 13, wherein the channels defined by the plugs communicate with a pair of channels provided in an outer surface of the support structure body that extends around the aperture.

16. A mirror structure as in claim 15, wherein channels defined by alternate plugs communicate with one or the other, in turn, of the pair of channels in the support structure body.

17. A mirror structure as in claim 1 wherein said support structure is a flexible support structure.

* * * * *